Sept. 16, 1958  J. SALAUZE  2,852,592
DEFERRED ACTION PRIMARY CELLS
Filed Oct. 27, 1954

INVENTOR.
JEAN SALAUZE

BY
*Kenyon & Kenyon*
ATTORNEYS

United States Patent Office 2,852,592
Patented Sept. 16, 1958

2,852,592

DEFERRED ACTION PRIMARY CELLS

Jean Salauze, Paris, France, assignor to Societe des Accumulators Fixes et de Traction (Societe Anonyme) Romainville, France, a company of France Application October 27, 1954, Serial No. 465,068

Claims priority, application France November 4, 1953

9 Claims. (Cl. 136—90)

Deferred action cells in which the electrolyte is not brought into contact with the electrodes until the moment it is wanted, are already known in the art. It is sometimes necessary that the impregnation of the electrodes with the electrolyte be practically immediate, in order that the cell may deliver electrical current at as full a rate as possible, from the moment decided upon.

The object of the present invention is a deferred action cell fulfilling such conditions.

According to the invention, the primary cell is constituted by a tight, rigid case closed by a resistant, flexible membrane, said case being internally divided into two tight compartments by a partition capable of bursting, the upper compartment being bounded by the rigid case and said partition, in which the electrodes are placed, the lower compartment being bounded at least by said partition and the flexible membrane, which contains the electrolyte. Said internal partition capable of bursting will be identified in the following by "frangible partition." It must be noted that we shall thus call any partition likely to break off, thereby forming a large aperture (and not only a split). This happens when the partition is rigid and breaks into pieces under the effect of pressure or impact. It may also occur whenever the partition is an elastic foil stretched out on its periphery, any split promoting a shrinkage of the elastic substance onto the periphery.

A mechanical action, therefore, exerted on the flexible membrane, is transmitted, through the medium of the upper compartment content, to the frangible partition, which action can be sufficient to make said partition burst open, thereby bringing the electrolyte abundantly into contact with the electrodes as soon as said action is started.

According to an embodiment of the invention, the upper compartment is practically filled up with the electrolyte. The liquid, which is not compressible, imparts to the frangible partition the totality of the efforts exerted on the flexible membrane, thereby bursting said frangible partition open.

According to another embodiment of the invention, the flexible membrane is provided, inside the electrolyte compartment, with a rigid breaking instrument or plunger directed toward the frangible partition so that the action exerted from the outside on the flexible membrane reaches, through the medium of the plunger, the frangible partition, the place where it gets broken being thus exactly located. Said place can be selected in such a way as the electrodes and separators may be impregnated with the electrolyte within as short time as possible. According to another embodiment of the invention, the plunger is so shaped as to strike several impacts against the frangible partition, thereby producing a wide aperture in it. According to another embodiment of the invention relating more particularly to cells comprising electrodes having large dimensions and being parallel with the frangible partition, or on the contrary, comprising a great number of electrodes connected in parallel, the surface of which being perpendicular to said partition, several plungers are provided in order to break the frangible partition simultaneously at several points, thereby ensuring the penetration of the electrolyte into the electrode and separator containing compartment within as short time as possible.

According to an embodiment of the invention, in order to mark exactly the place where the partition breaks and to reduce to a minimum the importance of the action to be exerted on the flexible membrane so as to burst the frangible partition, said partition may be supported by a holding member which is a thick, rigid partition perforated with holes. Said holes are distributed at the very places where the electrolyte is intended to find its way into the electrode compartment. Of course the plungers, when these are used in the structure of the cell, are situated opposite said holes. The frangible partition, therefore, is supported on its whole surface, except for the places where it is meant to burst.

According to the above description, the frangible partition can be either rigid or flexible. Rigid partitions may be ebonite, ordinary or tempered glass. When such partitions are used, one can in the same time render their breaking easier and mark the place where it is meant to occur, either by locally thinning down the breaking area, or else by bounding it with a closed outline marked by removal of material. The flexible frangible partition may be a thin rubber foil stretched out on its periphery.

According to a preferred embodiment of the invention, the sets of electrodes and separators are parallel with the frangible partition and their stack is provided with as many canals as there will be openings made in the partition, each canal being in a line with an opening. Thus, the electrolyte flowing into all the canals comes very quickly to permeate the whole surface of the separators and the electrodes. The separators which are placed between electrodes of different polarities are made of an absorbent material.

The following description connected with the attached drawing, given by way of illustration and not to be construed as limiting the invention, will serve to provide an understanding of an embodiment of the invention, the characteristics to be found in the description as well as in the drawing being of course a part of said invention.

Figure 1:
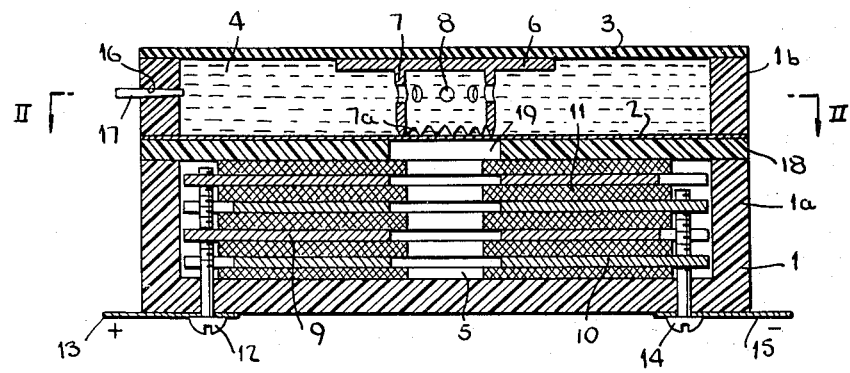
Figure 1 is an axial section of a cell of a general cylindrical shape built according to the invention.
Figure 2:
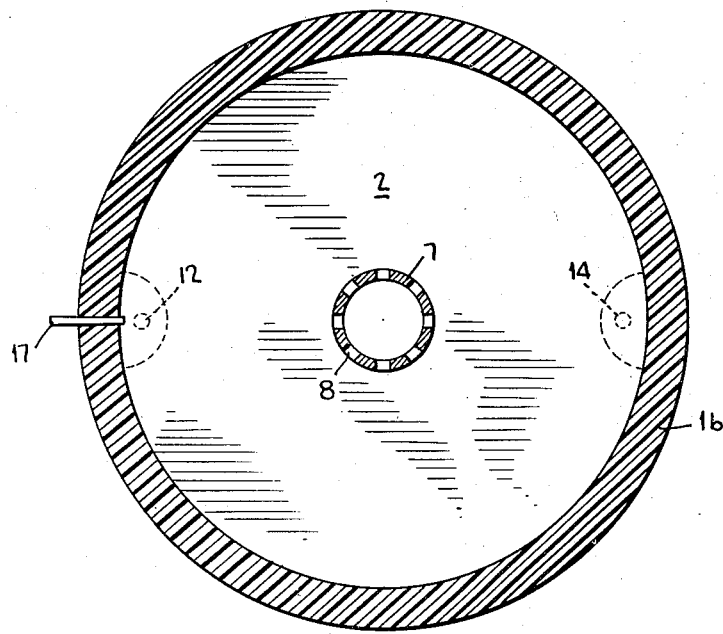
Figure 2 is a section along line II—II of drawing 1.

The cell shown in Figure 1 comprises a cylindrical case 1 internally divided by a thin, frangible partition 2 capable of bursting open. Said frangible partition 2 can be supported by a thick rigid holding member 18 in which an aperture 19 is perforated, the diameter of said aperture exceeding the diameter of the plunger rod 7, said aperture 19 facing rod 7 which, when put into motion by the impact, can thus pass through said aperture. Said case is closed by a resistant flexible membrane 3 which, together with the frangible partition, bounds two distinct tight compartments inside the case. The upper compartment 4 contains the electrolyte, the lower compartment 5 encloses the electrodes.

According to the practical embodiment shown in Figure 1, case 1 actually comprises a bottom 1a and an annular part 1b, between both of which the frangible partition 2 is placed. The parts 1a and 1b may be made of ebonite of a suitable thickness; the frangible partition may be also constituted by a thin ebonite plate, since said substance in such form can easily be caused to break into pieces. The membrane 3 can be made of rubber, thereby permitting a tight assembly of the varied elements, either by means of sticking or vulcanization.

According to the above described embodiments, the case, the frangible partition, the supporting member 18 and the flexible membrane are all four preferably made of materials of the same nature, unalterable in the electrolyte, thereby permitting to realize a strictly electrolyte tight assembly of the four elements through a suitable sticking operation.

A rigid, preferably metallic disc 6 integral with a cylindrical hollow part 7 which forms a plunger, is applied onto the internal side of membrane 3. The lower edge of said cylindrical part is thinned down and indented at 7a, so as to strike the partition at many points. Besides, said plunger may be provided with apertures 8.

The electrode plates are placed in the lower compartment; the positive plates 9 and the negative plates 10 alternate throughout the assembly. Between two adjoining electrodes there is a separator 11 which may consist of a layer of highly absorbent textile fibres.

The positive plates 9 are all electrically connected together by means of a screw 12 which passes tightly through the bottom of the case, said screw being fitted with a thin, soldered, metallic tongue 13. The negative plates likewise are all connected together by means of the screw 14 fitted with a thin, soldered, metallic tongue 15. In order that they may be insulated from the screws of the opposite polarity, the electrode plates 9 and 10, whose shape is circular, are provided with indented edges, so as to offer a free passage to the screws with which they are not to be connected. The indentations of two adjoining plates are thus diametrically opposed.

All the plates are drilled in their centre with a circular opening. These openings placed in a line form a central canal the diameter of which corresponds to the diameter of plunger 7. The separators 11 are also perforated with circular apertures, but the diameter of these being smaller, the central terminal parts of said separators extend beyond the internal sides of the canal formed by the apertures of the plates. They are advantageously constituted by felted cotton fibres called cotton "sheets."

The positive and negative plates which form the electrochemical couple and their separators are in the dry state assembled in the lower compartment 5. The electrolyte is enclosed within the upper compartment. It may be introduced there, by means of a syringe, through the side opening 16 drilled in the annular part 1b, said opening being hereafter stopped with a stuck plug 17. The cell is thus ready for use.

If a pressure is suddenly exerted on membrane 3, it flattens down and the plunger 7 breaks the frangible partition 2 by making in it an aperture having dimensions comparable with the terminal dimensions of said plunger. The electrolyte, then, may pass (if necessary through the apertures 8) through said partition aperture into the central canal where it comes to impregnate the set of separators, thereby enabling the cell to operate.

As long as the electrolyte has not flowed into the lower compartment, the electrodes are electrically insulated one from the other and the circuits connected with the thin, soldered, metallic tongues 13 and 15 may be electrically closed in advance. Besides, as the electrolyte cannot come into contact with the electrodes, and as the latter are protected from the air moisture, they can be safely stocked before being used.

The mechanical action exerted on membrane 3 can be of any kind. It may derive for instance from the impact of a solid body or from the pressure of a fluid exerted on said membrane. The mechanical action on membrane 3 may also be produced simply by inertia effect if dics 6 and plunger 7 have an appreciable bulk, and if the acceleration imparted to case 1 towards the top of the drawing in Figure 1 is sufficient, as it is the case for the projectiles.

Between the moment of the action exerted on membrane 3 and the moment the cell is put into use, there hardly elapses a fraction of a second.

It will be quite clear that modifications may be made to the improved arrangements which have just been described above, in particular by the substitution of equivalent technical means, without thereby departing from the spirit or from the scope of the present invention.

What is claimed is:

1. Deferred action cell comprising a rigid case tightly closed at the top by a resistant flexible membrane of rubber or the like, internally divided into two tight compartments by a thin frangible partition, the lower compartment bounded by the case bottom and said frangible partition and enclosing sets of electrodes and separators, the upper compartment being bounded by said frangible partition and said flexible membrane and being practically filled up with the electrolyte, and said electrolyte being in permanent contact with both said frangible partition and said membrane whereby external pressure exerted on the membrane will be transmitted undiminished via the electrolyte to the frangible member to facilitate rupture of the latter and thereafter force the electrolyte under pressure into the lower compartment.

2. The cell according to claim 1 wherein the frangible partition is a thin rubber foil stretched out around its periphery.

3. The cell according to claim 1 wherein the frangible partition is a substance selected from the group consisting of ebonite, glass and tempered glass.

4. The cell according to claim 1 wherein the frangible partition has breaking areas which are thinner than the remainder of said partition.

5. The cell according to claim 1 wherein a thick rigid holding member provided with at least one aperture supports the frangible portion.

6. Deferred action cell comprising a rigid case tightly closed at the top by a resistant flexible membrane of rubber or the like, a thin frangible partition internally dividing the case into two tight compartments, the lower comparment being bounded by the case bottom and the frangible partition and sets of electrodes and separators enclosed therein, the upper compartment being bounded by the frangible partition and the flexible membrane and electrolyte substantially completely filling said upper compartment and being in permanent contact with both said frangible partition and said membrane, and a rigid plunger located in the latter compartment and being secured to said flexible membrane, said plunger being disposed so as to break the frangible partition whenever appropriate inwardly directed pressure is exerted on the flexible membrane, and thereafter to force the electrolyte into said lower compartment.

7. Deferred action cell comprising a rigid case tightly closed at the top by a resistant flexible membrane of rubber or the like, a thin frangible partition internally dividing the case into two tight compartments, the lower compartment bounded by the case bottom and the frangible partition, sets of electrodes and separators enclosed therein the upper compartment being bounded by the frangible partition and the flexible membrane and being substantially filled with electrolyte which is in complete contact with the membrane and the frangible member, and at least one rigid plunger in the latter compartment integral with the flexible membrane, said plunger being disposed so as to break the frangible partition whenever appropriate inwardly directed pressure is exerted on the flexible membrane and thereafter to force the electrolyte into said lower compartment, and a thick rigid holding member provided with holes corresponding in number to the number of plungers on said flexible membrane, said holding member being disposed between the two compartments and supporting said flexible membrane and each of the said holes facing a plunger and having a greater diameter than the plunger it faces.

8. Deferred action cell comprising a cylindrical rigid case tightly closed at the top by a resistant flexible membrane of rubber or the like, a thin frangible partition parallel with the membrane and the case bottom internally dividing the case into two tight compartments, the lower compartment being bounded by the case bottom and the frangible partition, sets of electrodes and separators enclosed therein, each separator being placed between two electrodes of opposite polarities, said electrodes and separators being parallel with the frangible partition and forming a cylindrical block provided with at least one vertical canal, and the upper compartment bounded by the frangible partition and the flexible membrane being practically filled up with electrolyte which is in permanent contact with both the membrane and the partition whereby external pressure exerted on the membrane will be transmitted by the electrolyte to fracture the partition and thereafter force the electrolyte into the lower compartment.

9. Deferred action cell comprising a cylindrical rigid case tightly closed at the top by a resistant flexible membrane of rubber or the like, a thin frangible partition parallel with the membrane and the case bottom internally dividing the case into two tight compartments, the lower compartment being bounded by the case bottom and the frangible partition, sets of electrodes and separators enclosed therein, each separator being placed between two electrodes of opposite polarities, said electrodes and separators being parallel with the frangible partition and forming a cylindrical block provided with at least one vertical canal, and the upper compartment bounded by the frangible partition and the flexible membrane containing electrolyte which substantially fills the upper compartment and is in permanent contact with both said membrane and said partition and at least one rigid plunger integral with flexible membrane, each plunger facing a corresponding canal and being disposed so as to break the frangible partition whenever a suitable inward pressure is exerted on the flexible membrane, said pressure thereafter serving to force said electrolyte into the lower compartment.

References Cited in the file of this patent

UNITED STATES PATENTS

| | | |
|---|---|---|
| 1,485,282 | Marko | Feb. 26, 1924 |
| 2,534,056 | Pitt | May 15, 1947 |
| 2,452,049 | Hauck | Oct. 26, 1948 |
| 2,502,723 | Harriss | Apr. 4, 1950 |
| 2,594,879 | Davis | Apr. 29, 1952 |
| 2,624,767 | Moulton | Jan. 6, 1953 |
| 2,674,946 | Hjelm | Apr. 13, 1954 |

FOREIGN PATENTS

| | | |
|---|---|---|
| 691,165 | Great Britain | May 6, 1953 |
| 1,089,711 | France | Oct. 6, 1954 |